(12) United States Patent
Oshita et al.

(10) Patent No.: US 6,477,033 B2
(45) Date of Patent: Nov. 5, 2002

(54) NONLINEAR DIELECTRIC ELEMENT

(75) Inventors: Kazuhito Oshita, Okayama (JP); Shinichi Kobayashi, Izumo (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 09/941,428

(22) Filed: Aug. 28, 2001

(65) Prior Publication Data

US 2002/0046876 A1 Apr. 25, 2002

(30) Foreign Application Priority Data

Sep. 7, 2000 (JP) ......................................... 2000-271320

(51) Int. Cl.$^7$ .............................................. H01G 4/228
(52) U.S. Cl. .................. 361/306.3; 361/311; 361/321.1; 361/321.5; 361/321.2
(58) Field of Search ........................... 361/306.3, 321.2, 361/321.4, 321.5, 329, 325, 321.1, 320, 311, 312

(56) References Cited

U.S. PATENT DOCUMENTS

| | | | | |
|---|---|---|---|---|
| 4,835,656 A | * | 5/1989 | Kitahara et al. | 361/321 |
| 4,858,066 A | * | 8/1989 | McSweeney | 361/321 |
| 5,059,566 A | * | 10/1991 | Kanai et al. | 501/138 |
| 5,561,587 A | * | 10/1996 | Sanada | |
| 5,590,017 A | * | 12/1996 | Kelso | |
| 5,895,719 A | * | 4/1999 | Fyles et al. | 428/220 |
| 6,081,417 A | * | 6/2000 | Matsuki | |
| 6,362,947 B1 | * | 3/2002 | Chazono | |

FOREIGN PATENT DOCUMENTS

| | | | |
|---|---|---|---|
| JP | 5-87940 | * | 12/1993 |
| JP | 11-214257 | * | 8/1999 |
| JP | 411219853 | * | 8/1999 |

* cited by examiner

*Primary Examiner*—Dean A. Reichard
*Assistant Examiner*—Nguyen T Ha
(74) *Attorney, Agent, or Firm*—Dickstein, Shapiro, Morin & Oshinsky, LLP.

(57) ABSTRACT

A nonlinear dielectric element in which degradation of nonlinear characteristics in an electric field-electric charge is not likely to occur and a large pulse voltage can be reliably achieved is provided. It is composed of an element body of a dielectric ceramic exhibiting nonlinear behavior in an electric field-electric charge, electrodes formed on the top face and bottom face, respectively, of the element main body, and insulation layers formed so as to cover from the neighborhood of the rims of the electrodes to each of the outer regions of the top face and the bottom face, the electrodes contain a conductive component and barium oxide borosilicate glass, and the insulation layers containing barium oxide borosilicate glass.

16 Claims, 1 Drawing Sheet

NONLINEAR DIELECTRIC ELEMENT

BACKGROUND OF THE INVENTION

1. Field of the Invention

The present invention relates to a nonlinear dielectric element, for example, a capacitor for generating high voltage pulses used for a high-intensity discharge lamp, which exhibits a characteristic of nonlinear behavior in an electric field-electric charge. In particular, the present invention relates to a nonlinear dielectric element in which insulation layers are formed covering the end parts of electrodes in order to improve insulation performance.

2. Description of the Related Art

High-intensity discharge lamps (HID lamps) are known. Among the HID lamps, there are lamps, such as high-pressure sodium lamps and metal halide lamps, in which high voltage pulses of about 1 to 4 kV are necessary during startup. Therefore, capacitors exhibiting nonlinear characteristics are incorporated in the HID lamps of this nature in order to generate high voltage pulses.

For example, a high-pressure discharge lamp including a nonlinear capacitor for generating high voltage pulses is disclosed in Japanese Examined Patent Application Publication No. 5-87940. The structure of the nonlinear capacitor described in this publication will be explained with reference to FIG. 1.

A nonlinear capacitor 1 has a structure in which electrodes 3 and 4 are formed on both faces of a ceramic board 2 made of barium titanate ceramic. Lead terminals 7 and 8 are connected to each of the central portion of the electrodes 3 and 4, respectively, with junction members 5 and 6 therebetween. The whole structure including the ceramic board 2 and the electrodes 3 and 4, except for the portion where the lead terminals 7 and 8 are lead out, is covered with an insulation layer 9.

The aforementioned electrodes 3 and 4 are formed by applying a conductive paste containing, for example, a silver powder and at least one of borosilicate glass and lead borosilicate glass on the ceramic board 2 by coating, and thereafter, by baking.

The insulation layer 9 is formed by applying a paste containing a glass powder on each of the surfaces of the ceramic board 2 and the electrodes 3 and 4 by coating, and thereafter, by baking.

According to the aforementioned nonlinear capacitor 1, the insulation performance between the electrodes 3 and 4 is improved by being provided with the insulation layer 9, so that a structure suitable for generating high voltage pulses can be achieved.

However, the aforementioned conventional nonlinear capacitor 1 may encounter a problem in that the intrinsic nonlinear characteristics of a ceramic board 2 made of barium titanate ceramic cannot be sufficiently exhibited. This is believed to be because the glass component in the conductive paste used for forming the electrodes 3 and 4 diffuses into the ceramic board 2 during baking, so as to degrade the nonlinear characteristics of the ceramic board 2.

In order to solve the aforementioned problems, it is described in Japanese Unexamined Patent Application Publication No. 11-214257 that when the glass component contained in the electrodes 3 and 4 is made to be at least one of bismuth-containing lead borosilicate glass and barium oxide borosilicate glass, the nonlinear characteristics of the dielectric ceramic constituting the ceramic board 2 can be sufficiently exhibited, and consequently, a nonlinear dielectric element which can exhibit excellent nonlinear characteristics can be realized.

The aforementioned measure relates to an avoidance of a reverse effect on the ceramic board 2 due to the glass component contained in the electrodes 3 and 4. It is a fact that the glass component contained in the electrodes 3 and 4 can be prevented from hindering the nonlinear characteristics of the ceramic board 2.

However, the nonlinear capacitor 1 as shown in FIG. 1, provided with the insulation layer 9, the glass component contained in the insulation layer 9 causes a problem similar to that in the above description. That is, there is a problem in that the glass component contained in the insulation layer 9 is also likely to diffuse into the ceramic board 2, so as to penetrate into grain boundaries of the ceramic constituting the ceramic board 2 and to degrade the nonlinear characteristics thereof. If the nonlinear characteristics are thus degraded, when high voltage pulses are generated by the nonlinear capacitor 1, pulse voltages are reduced.

SUMMARY OF THE INVENTION

Accordingly, it is an object of the present invention to provide a nonlinear dielectric element which can solve the aforementioned problems.

According to an aspect of the present invention, a nonlinear dielectric element exhibiting nonlinear behavior in an electric field-electric charge has an element main body composed of a dielectric ceramic exhibiting the nonlinear behavior, first and second electrodes formed on first and second faces opposing each other, respectively, of the element main body, and insulation layers formed on the element main body so as to cover at least a part of the first and second electrodes. Wherein, in order to solve the aforementioned technical problems, the first and second electrodes contain a conductive component and barium oxide borosilicate glass, and the insulation layers contain barium oxide borosilicate glass.

In the present invention, the barium oxide borosilicate glass contained in the insulation layers preferably has the same composition as that of the barium oxide borosilicate glass contained in the first and second electrodes.

In the present invention, the first and second electrodes are preferably formed leaving each of the outer regions of the first and second faces of the element main body uncovered.

In the aforementioned case, the insulation layers are more preferably formed so as to cover from the neighborhood of the rims of the first and second electrodes to the outer regions of the first and second faces.

The nonlinear dielectric element according to the present invention is preferably used as a capacitor for generating high voltage pulses.

DESCRIPTION OF THE PREFERRED EMBODIMENTS

Figure 2:
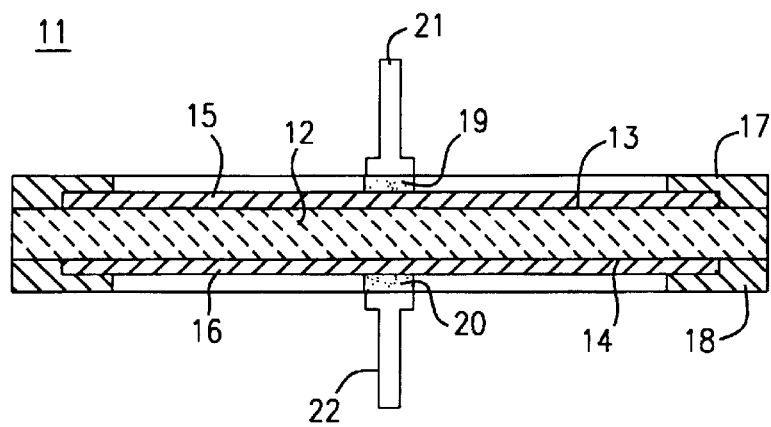
FIG. 2 is a sectional view of a nonlinear dielectric element 11 according to an embodiment of the present invention.

FIG. 2 is a sectional view of a nonlinear dielectric element 11 according to an embodiment of the present invention.

This nonlinear dielectric element 11 is used as, for example, a capacitor for generating high voltage pulses in order to generate high voltage pulses for startup of HID lamps.

The nonlinear dielectric element 11 is provided with an element main body 12 in the shape of a disk. The element main body 12 may also be in the shape of a rectangular board, etc. The element main body 12 is composed of dielectric ceramic which exhibits nonlinear behavior (hysteresis) in the electric field-electric charge. As the aforementioned dielectric ceramic, for example, a barium titanate dielectric ceramic can be appropriately used.

On the top face 13 and the bottom face 14, opposing each other, of the element main body 12, a first and second electrodes 15 and 16 in the shape of, for example, a circle, are formed, respectively. In this embodiment, each diameter of the electrodes 15 and 16 is made to be smaller than the diameter of the element main body 12, and therefore, the electrodes 15 and 16 are formed leaving exposed each of the outer regions of the top face 13 and the bottom face 14, respectively. The aforementioned configuration increases the creeping distance between the electrodes 15 and 16, so that it is effective to improve the insulation performance.

The electrodes 15 and 16 are formed by applying a conductive paste containing a metal powder as a conductive component and barium oxide borosilicate glass as a glass component on the top face 13 and the bottom face 14 by coating, and thereafter, by baking. As a consequence, the electrodes 15 and 16 have compositions containing the aforementioned metal and barium oxide borosilicate glass after the baking.

Figure 1:
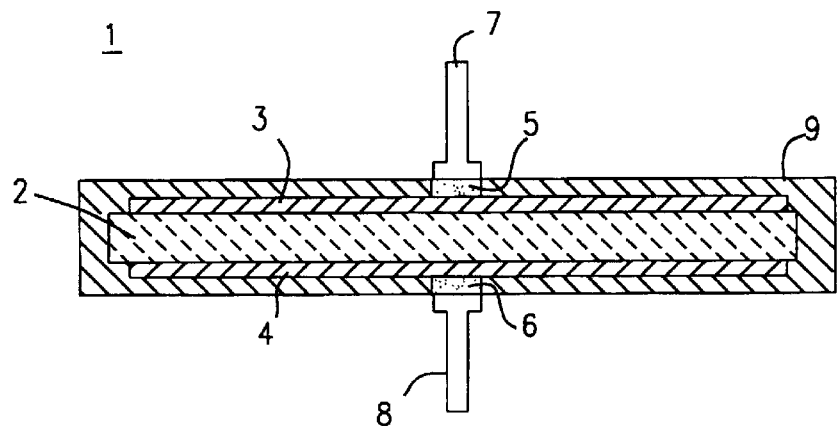
FIG. 1 is a sectional view of a conventional nonlinear capacitor 1.

Furthermore, on the element main body 12, insulation layers 17 and 18 are formed so as to cover at least a part of the first and second electrodes 15 and 16. In this embodiment, the insulation layers 17 and 18 have plan shape of a ring so as to cover from the neighborhood of the rims of the first and second electrodes 15 and 16 to the outer regions of the top face 13 and the bottom face 14, respectively. The insulation layers 17 and 18 may be formed so as to cover almost whole structure including the element main body 12 and the electrodes 15 and 16, in a manner similar to that in the nonlinear capacitor 1 as shown in FIG. 1.

The insulation layers 17 and 18 are formed by applying a paste containing a barium oxide borosilicate glass powder on each of the predetermined regions of the top face 13, the bottom face 14, and the electrodes 15 and 16 by printing, etc., and thereafter, by baking. As a consequence, insulation layers 17 and 18 have compositions containing barium oxide borosilicate glass after the baking. Preferably, the barium oxide borosilicate glass contained in the insulation layers 17 and 18 has the same composition as that of the barium oxide borosilicate glass contained in the aforementioned electrodes 15 and 16.

Lead terminals 21 and 22 are connected to each of the central portions of the electrodes 15 and 16, respectively, with junction members 19 and 20 therebetween. As the junction members 19 and 20, any known junction members can be used as long as the electrodes 15 and 16 and the lead terminals 21 and 22 can be connected to each other, respectively. For example, silver-based junction members, etc., can be used advantageously. The lead terminals 21 and 22 are composed of metal, such as nickel and copper.

According to this embodiment, the barium oxide borosilicate glass is adopted as the glass for forming the insulation layers 17 and 18. This barium oxide borosilicate glass has the property of being not likely to diffuse into the dielectric ceramic constituting the element main body 12.

Furthermore, the area of the element main body 12 covered with the insulation layers 17 and 18 can be reduced, as long as the insulation layers 17 and 18 cover from the neighborhood of the rims of the first and second electrodes 15 and 16 to the outer regions of the top face 13 and the bottom face 14 of the element main body 12.

Accordingly, the glass component contained in the insulation layers 17 and 18 can be prevented from penetrating into the grain boundaries of the dielectric ceramic constituting the element main body 12. Therefore, the degradation of the nonlinear characteristics in the electric field-electric charge of the element main body 12 is not likely to occur, and a large pulse voltage can be reliably achieved in the nonlinear dielectric element 11.

When the barium oxide borosilicate glass contained in the insulation layers 17 and 18 has the same composition as that of the barium oxide borosilicate glass contained in the first and second electrodes 15 and 16, conjunction performance between the insulation layers 17 and 18 and the electrodes 15 and 16 is improved, so that the reliability of the nonlinear dielectric element 11 can be improved.

A specific embodiment according to the present invention will be explained below using examples.

EXAMPLES

As a dielectric material exhibiting nonlinear characteristics, barium titanate ceramic was used. The powder thereof was dry-pressed and baked so as to produce a disk-like element main body of 18 mm in diameter and 1 mm in thickness.

A conductive paste in which 5 parts by volume of barium oxide borosilicate glass (B—Si—Ba) frit was blended into 100 parts by volume of silver powder was prepared.

Regarding each of Examples 1 and 2 and Comparative Examples 1 to 3, on the top and bottom faces of the element main body prepared as described above, the aforementioned conductive paste was applied by printing with a circular pattern of 16 mm in diameter, and was baked at 900° C. so as to form electrodes composed of barium oxide borosilicate glass (B—Si—Ba) as shown in Table 1.

As a glass-containing paste for forming insulation layers, a glass-containing paste composed of 70% by weight of glass frit and 30% by weight of organic vehicle, in which an ethyl cellulose resin was dissolved into a terpineol-based solvent, was produced. As shown in Table 1, glass frit made of barium oxide borosilicate glass, that is, B—Si—Ba glass, was used in Example 1, and in Example 2, glass frit made of barium boroaluminosilicate glass, that is, B—Si—Ba—Al glass, was used. In Comparative Example 2, glass frit made of lead borosilicate glass, that is, B—Si—Pb glass, was used, and in Comparative Example 3, glass frit made of bismuth borosilicate glass, that is, B—Si—Bi glass, was used.

Then, as described above, the aforementioned glass paste was applied in the shape of a ring of 17 mm in outer diameter and 14 mm in inner diameter by printing on the top face and the bottom face of the element main body, and was baked at 850° C. so as to form insulation layers covering from each of the neighborhood of the rims of the electrodes to each of the outer regions of the top face and the bottom face of the element main body.

Regarding Comparative Example 1, such an insulation layer was not formed.

Subsequently, lead terminals made of nickel wire of 0.5 mm in diameter having a flange portion of 2 mm in diameter at the tip and silver-based junction members was prepared. A silver-based junction member was arranged between the lead terminal and the electrode, and was baked at 500° C. so as to connect each of the lead terminals and the electrodes, so that a nonlinear dielectric element to become a sample was completed.

Figure 3:
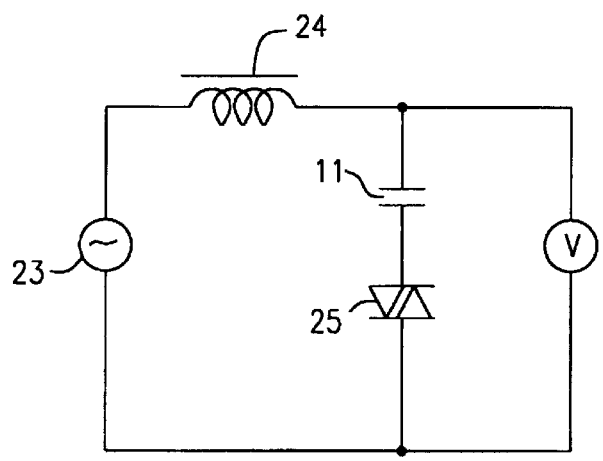
FIG. 3 is a diagram of a circuit used for measuring a generated pulse voltage of a nonlinear dielectric element 11 in examples.

Regarding the resulting nonlinear dielectric element according to each of Examples 1 and 2 and Comparative Examples 1 to 3, the circuit as shown in FIG. 3 was configured, a pulse was generated and the pulse voltage was measured. That is, in the circuit as shown in FIG. 3, a ballast 24 for high pressure mercury lamp of 400W is connected to a power source 23 in series, and subsequent to the ballast 24 for high pressure mercury lamp, a nonlinear dielectric element 11 and a semiconductor switch 25 with a breakover voltage of 150 V are connected. V indicates a voltmeter.

TABLE 1

|  | Kind of Glass in Electrode | Kind of Glass in Insulation Layer | Pulse Voltage (V) |
| --- | --- | --- | --- |
| Example 1 | B-Si-Ba | B-Si-Ba | 2000 |
| Example 2 | B-Si-Ba | B-Si-Ba-Al | 1950 |
| Comparative Example 1 | B-Si-Ba | Insulation Layer is not formed | 2000 |
| Comparative Example 2 | B-Si-Ba | B-Si-Pb | 1700 |
| Comparative Example 3 | B-Si-Ba | B-Si-Bi | 1600 |

As is clear from Table 1, the generated pulse voltage of the nonlinear dielectric element according to Comparative Example 1 in which an insulation layer was not formed, was 2000 V, while the generated pulse voltages of the nonlinear dielectric elements according to Examples 1 and 2, in which barium oxide borosilicate glass was used for forming the insulation layers, were 2000 V and 1950 V, respectively, and a reduction of the generated pulse voltage did not occur or hardly occurred.

On the other hand, the generated pulse voltages of the nonlinear dielectric elements according to Comparative Examples 2 and 3, in which lead borosilicate glass or bismuth borosilicate glass was used for the insulation layers, were as low as 1700 V and 1600 V, respectively, and therefore, it is clear that the nonlinear characteristics have been degraded by a large degree. This is believed to be because the glass component in the insulation layer diffuses into the ceramic constituting the element main body.

Accordingly, it is clear that by using barium oxide borosilicate glass equivalent to the glass component contained in the electrodes in order to form the insulation layer, a large pulse voltage can be achieved without degradation of the nonlinear characteristics of the dielectric ceramic constituting the element main body.

In the aforementioned examples, a silver powder was used as a metal powder contained in the conductive paste for forming the electrode, although, by using a powder made of, for example, copper, aluminum, nickel, platinum or palladium, or alloys thereof, as long as excellent conductivity is exhibited, effects substantially similar to those in the aforementioned examples can be achieved.

As the organic vehicle contained in the glass-containing paste for forming the insulation layer in the aforementioned examples, one in which an ethyl cellulose resin was dissolved into a terpineol-based solvent was used. However, as the binder component contained in the organic vehicle, resins for general applications, for example, an acrylic resin, a butyral resin, etc., may be used, and as the solvent, for example, an alcohol-based solvent, a hydrocarbon-based solvent, etc., may be used. The content of the glass frit in the glass-containing paste was 70% by weight in the aforementioned examples, although this is not limited.

According to the present invention, in the nonlinear dielectric element provided with the element main body composed of the dielectric ceramic exhibiting the nonlinear behavior in an electric field-electric charge having the first and second electrodes formed on the first and second faces opposing each other, respectively, of the element main body, and insulation layers formed on the element main body so as to cover at least a part of the first and second electrodes, the first and second electrodes contain conductive component and barium oxide borosilicate glass, and the insulation layers contain barium oxide borosilicate glass. Consequently, since this barium oxide borosilicate glass has the property of being not likely to diffuse into the dielectric ceramic, the glass component can be prevented from penetrating into the grain boundaries of the dielectric ceramic constituting the element main body, and therefore, the degradation of the nonlinear characteristic in the electric field-electric charge is not likely to occur, and a large pulse voltage can be reliably achieved in the nonlinear dielectric element.

When the barium oxide borosilicate glass contained in the insulation layers has the same composition as that of the barium oxide borosilicate glass contained in the electrodes, the conjunction performance between the insulation layers and the electrodes is improved, so that a nonlinear dielectric element, in which the pulse voltage is not reduced, and the reliability is improved, can be produced.

When the first and second electrodes are formed leaving the outer regions of the first and second faces of the element main body exposed, since the creeping distance between the first and second electrodes can be increased, the insulation performance of the nonlinear dielectric element can be improved.

In the aforementioned case, when the insulation layers are formed so as to cover from the neighborhood of the rims of the first and second electrodes to the outer regions of the first and second faces, since the area of the element main body covered with the insulation layers can be reduced, the glass component contained in the insulation layers can be satisfactorily prevented from penetrating into the grain boundaries of the dielectric ceramic constituting the element main body.

The nonlinear dielectric element according to the present invention can be advantageously used as a capacitor for generating high voltage pulses.

What is claimed is:

1. A nonlinear dielectric element exhibiting nonlinear behavior in an electric field-electric charge, comprising:
    an element main body comprising a dielectric ceramic exhibiting said nonlinear behavior and having opposing first and second faces;
    first and second electrodes on first and second faces, respectively, of said element main body; and
    first and second insulation layers on said element main body disposed so as to cover at least a part of said first and second electrodes, respectively wherein:
    said first and second electrodes comprise a conductive component and a barium oxide borosilicate glass; and
    said first and second insulation layers comprise a barium oxide borosilicate glass.

2. A nonlinear dielectric element according to claim 1, wherein the barium oxide borosilicate glass of said insulation layers has the same composition as the barium oxide borosilicate glass of said first and second electrodes.

3. A nonlinear dielectric element according to claim 2, wherein said first and second electrodes do not extend to the outer regions of said first and second faces, respectively.

4. A nonlinear dielectric element according to claim 3, wherein said first and second insulation layers extend from the neighborhood of the extent of said first and second electrodes to at least a part of the outer regions of said first and second faces, respectively.

5. A nonlinear dielectric element according to claim 4, wherein each of said first and second electrodes and said first and second insulation layers have the plan shape of a ring.

6. A nonlinear dielectric element according to claim 5, wherein said first and second insulation layers extend to the entire outer regions of said first and second faces, respectively.

7. In a circuit having a capacitor for generating high voltage pulses, utilizing a nonlinear dielectric element according to claim 6 as said capacitor.

8. In a circuit having a capacitor for generating high voltage pulses, utilizing a nonlinear dielectric element according to claim 5 as said capacitor.

9. In a circuit having a capacitor for generating high voltage pulses, utilizing a nonlinear dielectric element according to claim 4 as said capacitor.

10. In a circuit having a capacitor for generating high voltage pulses, utilizing a nonlinear dielectric element according to claim 3 as said capacitor.

11. In a circuit having a capacitor for generating high voltage pulses, utilizing a nonlinear dielectric element according to claim 2 as said capacitor.

12. In a circuit having a capacitor for generating high voltage pulses, utilizing a nonlinear dielectric element according to claim 1 as said capacitor.

13. A nonlinear dielectric element according to claim 1, wherein said first and second electrodes do not extend to the outer regions of said first and second faces, respectively.

14. A nonlinear dielectric element according to claim 13, wherein said first and second insulation layers extend from the neighborhood of the extent of said first and second electrodes to at least a part of the outer regions of said first and second faces, respectively.

15. In a circuit having a capacitor for generating high voltage pulses, utilizing a nonlinear dielectric element according to claim 14 as said capacitor.

16. In a circuit having a capacitor for generating high voltage pulses, utilizing a nonlinear dielectric element according to claim 3 as said capacitor.

* * * * *